United States Patent
Schenbeck

[15] 3,698,665
[45] Oct. 17, 1972

[54] MULTICHANNEL AUTOPILOT WITH EQUALIZATION MEANS

[72] Inventor: Robert E. Schenbeck, Los Angeles, Calif.

[73] Assignee: McDonnell Douglas Corporation

[22] Filed: June 19, 1970

[21] Appl. No.: 47,741

[52] U.S. Cl. ............................244/77 M, 244/77 R
[51] Int. Cl. .............................................B64c 13/50
[58] Field of Search......244/77 R, 77 A, 77 M, 77 V, 244/77 SE

[56] References Cited

UNITED STATES PATENTS

| | | | |
|---|---|---|---|
| 3,496,836 | 2/1970 | Jenney | 244/77 R |
| 3,401,904 | 9/1968 | Nelson | 244/77 M |
| 3,438,306 | 4/1969 | Kazmarek | 244/77 R |
| 3,338,139 | 8/1967 | Wood | 244/77 M |

Primary Examiner—Andrew H. Farrell
Attorney—Walter J. Jason, Donald L. Royer and George W. Finch

[57] ABSTRACT

A multichannel automatic flight control system (AFCS) with equalization means for interfacing the two or more relatively independent channels thereof including means to sense relative imbalance between the channels and/or to sense inoperativeness in one of the channels.

3 Claims, 4 Drawing Figures

INVENTOR.
ROBERT E. SCHENBECK
BY George W. Finch
- ATTORNEY -

INVENTOR.
ROBERT E. SCHENBECK

MULTICHANNEL AUTOPILOT WITH EQUALIZATION MEANS

BACKGROUND OF THE INVENTION

Most of the known automatic flight control systems for aircraft incorporating automatic landing capability comprise at least two parallel nearly identical channels whose outputs are added in some convenient manner to drive the aircraft control systems. The effects of a failure in one of the channels are negated by the remaining good channels, and thus, a failure of one channel is passive. Means are provided to inform the pilot of such a failing at which time he must take over and complete the landing manually with visual reference to the ground. This requires the restriction of heretofore known automatic landing systems to conditions of ceiling and visibility at least as good as those required for a completely manual instrument flight rules (IFR) approach. Since it is desirable to utilize the benefits of automatic landing systems even in cases where there is substantially zero ceiling and visibility, it is undesirable to have such automatic landing systems restricted by the pilot in the control loop. Getting the pilot out of the control loop has been accomplished through design of fail operational systems, that is, systems which will continue to operate with no deterioration in performance after a single failure. This requires a minimum of three parallel and nominally identical channels with a more practical number being four or even five.

The use of a multiple channel automatic flight control system to control a single aircraft presents some unique problems which are solved by the present multichannel autopilot equalization means. These problems exist because in operation, each of the multiple control channels mentioned above attempts independently to drive the error of the controlled variable to zero. With two or more channels operating simultaneously, component tolerances make it a practical impossibility to drive the measured value of the error of the controlled variable to zero in more than one of the channels. Therefore, when the majority of the channels measure errors of the same sense, they will drive the corresponding aircraft control in a direction to reduce the errors until one of the following conditions is obtained. If an even number of control channels are employed, all channels will have measured errors with half being positive and half being negative. The channels continuously attempt to reduce those errors by driving their associated outputs in the appropriate directions and since an equal number of outputs are driving in each direction there is no net effect on the aircraft. The channels therefore become saturated and effective control is lost. On the other hand if an odd number of control channels are used, one channel will measure zero error and the remaining channels will be equally divided between the positive and negative errors. The channels measuring error will saturate but the channel with zero measured error will be uneffected and some, but usually unsatisfactory, control of the aircraft is retained. If satisfactory operation of such redundant control channels is to be achieved those channels having some measured error due to uncorrectable differences therebetween must be in some way tricked into thinking that in fact they do not have any measured error. The present multichannel autopilot equalization means accomplish this result.

SUMMARY OF THE INVENTION

Specifically, sensors are provided in each channel of a multichannel flight control system. These sensors respond to differences in commands generated by the independent channels and generate outputs which reduce the errors between the channels to a minimum value. This is done completely independently in each channel of the flight control system so that if one channel thereof becomes inoperative, the system can still continue to achieve an automatic landing. It is therefore a principle object of the present invention to provide means for reducing the errors between redundant channels in flight control systems.

Another object is to provide a fully equalized, multichannel flight control system which can remain operational even if one or more channels become inoperative.

Another object is to provide means for retaining effective control of an aircraft even under adverse condition.

Another object is to provide multichannel autopilot equalization means which can be used with any number of channels.

These and other objects and advantages of the present invention will become apparent after considering the following detailed specification which covers an embodiment of the subject autopilot in conjunction with the accompanying drawings.

DESCRIPTION OF THE PRESENT EMBODIMENT

Figure 1:
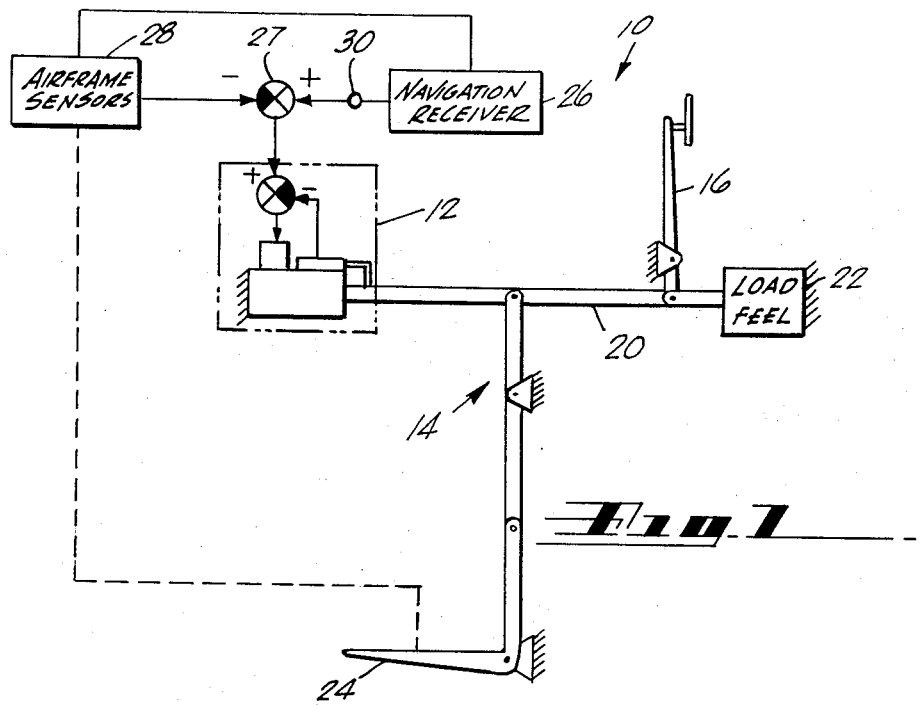
FIG. 1 is a diagrammatic presentation of a basic flight control system which for simplicity sake is shown only for the pitch axis thereof.

FIG. 1 schematically depicts the pitch axis of a simplified single channel automatic flight control system 10 (AFCS). It is shown in the Instrument Landing System (ILS) glide slope tracking mode since that mode is used during landing and therefore requires multichannel operation. The discussion hereafter applies equally well to most of the other AFCS modes, however. In the system 10 shown, an AFCS servo 12 is tied directly to the primary aircraft control system 14. The flight control system 14 includes a control column 16, linkage 20 therebetween and load feel means 22 connected to the linkage 20 to provide proper feel feedback to the pilot through the control column 16. An elevator control surface 24 is connected to be driven by the linkage 20 in response to movements of the control column 16 or of the AFCS servo 12 which is also connected directly thereto.

When the navigation receiver 26 in the aircraft senses a deviation from the desired flight path, it produces an output signal proportional to the path error. The output signal from the navigation receiver 26 is fed to a summer 27 where it is modified by adding thereto appropriate aerodynamic stabilization parameters generated by airframe sensors 28 whose outputs depend on many variables. The output signal from the summer 27 is fed to the AFCS servo 12.

Now consider the case where a trim change is encountered such as when the power or flap settings of the aircraft are changed or the landing gear is raised or lowered. Such trim changes produce pitching moments which, if not compensated for, will cause the aircraft to diverge from the glide slope and eventually stabilize at some new angle of descent, attitude and airspeed. Thus, if the desired angle of descent corresponding to the glide slope angle is to be maintained, a steady state elevator control surface deflection must be produced by the AFCS 10 to balance out the pitching moment induced by the trim change.

The aircraft when subjected to a trim change does initially pitch up (or down, depending on the trim change) and diverge from the glide slope. As this divergence occurs, an attitude change signal is generated by the sensors 28. At the same time the path error output signal from the navigation receiver 26 begins to build up. The sum of these two signals is fed to the AFCS servo 12 to command an elevator control surface deflection in a direction to try to return the aircraft toward the glide slope. So long as the control surface deflection is insufficient to balance the out-of-trim moment, however, the aircraft will continue to diverge from the glide slope but at a decreasing rate of divergence. Eventually, the sum of the pitch attitude change and path error signals will be great enough to cause the AFCS servo 12 to command a control surface deflection sufficient to balance the out-of-trim moment. In the steady state, this results in approximately the desired angle of descent. Any tendency to return to the glide slope however, causes a decrease in path error output signal, thus reducing the control surface deflection and causing the aircraft to diverge as before. The aircraft therefore stabilizes on a flight path generally parallel to but offset from the glide slope.

Figure 2:
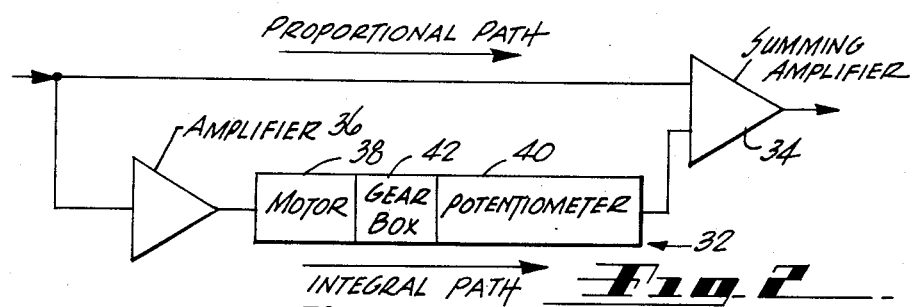
FIG. 2 is a diagrammatic representation of an automatic flight control system proportional plus integral loop.

A solution to this steady state offset is to incorporate in line 30 of FIG. 1 a synchronizing integrator 32 as shown in FIG. 2. The path error signal from the navigation receiver 26 due to a glide slope offset then commands a proportional surface position change and in addition, drives the integrator 32, the output of which is summed with the path error signal in a summing amplifier 34. The integrator 32 provides an increasing output signal to the summing amplifier 34 which together with the path error signal generates an output signal to drive the elevator control surface 24 in a direction to return the aircraft to the desired flight path on the glide slope. As the glide slope is intercepted the path error becomes zero and the output of the integrator 32 thereafter remains constant at the level required to maintain the elevator control surface deflection necessary for equilibrium on the glide slope.

The integrator 32 may be of known constructions, typically electronic or electromechanical in nature. An electromechanical type integrator 32 is shown in FIG. 2. It is comprised of an amplifier 36 which drives a motor 38 in proportion to the path error signal from the navigation receiver 26. The motor 38 in turn drives a potentiometer 40 through a gear box 42 and the potentiometer 40 generates the desired integral output signal for the summing amplifier 34.

Figure 3:
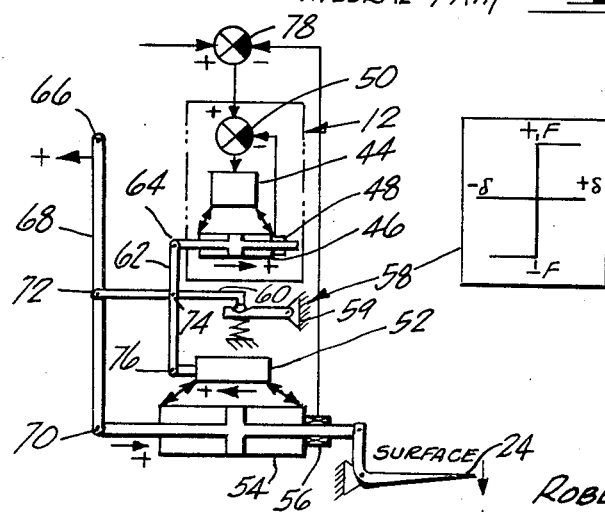
FIG. 3 is a schematic for a typical surface actuation system.

FIG. 3 schematically depicts a typical single channel control surface actuation unit. It incorporates an AFCS servo such as servo 12 in FIG. 1 which is shown as being of the electrohydraulic type. The AFCS servo 12 includes a transfer valve 44, a servo actuator 46 with an associated servo actuator position sensor 48 and a summer 50. The transfer valve 44 supplies hydraulic fluid to the servo actuator 46 to drive it a distance and direction proportional to the output signal from the summer 50 received by the transfer valve 44. The output signal from the summer 50 is in turn dependent upon the input signal to the servo 12 and the output signal from the servo actuator position sensor 48. Therefore the servo 12 responds to its input signal to reposition itself in correspondence thereto.

The servo 12 is operatively connected to control a control surface flow control valve 52 which in turn regulates the flow of hydraulic fluid to a control surface actuator 54 to move it in the direction commanded by the servo 12. The surface actuator 54 is connected to the control surface 24 and it includes a position sensor 56 for generating an output signal proportional to the position of the actuator 54 and the connected control surface 24.

Lockout means 58 are included in the system to provide a reaction point whereby the actuator 54 can drive the mechanical control system and additionally to provide means to override the system. These means usually have force (F) vs. deflection (δ) characteristics as shown in the box adjacent the lockout means 58. A mechanical device with approximately these characteristics is shown in FIG. 3 as a preloaded spring and cam centering device 59. The lockout means 58 are connected by a link 60 to another link 62 which in turn connects the AFCS servo actuator 46 to the flow control valve 52 to control its operation. The AFCS servo 12 and the lockout means 58 are matched so that the flow control valve 52 is in its null or zero flow position when the AFCS servo 12 is in its centered position and the lockout means 58 are not overridden.

When the aircraft is being flown manually, the lockout means 58 are disengaged and the servo actuator 46 is centered. A pivot 64 connecting the link 62 with the servo actuator 46 is therefore held in a predetermined stationary position to provide a fixed pivot point for the link 62. A manual input command generated by repositioning the control column 16 is applied at a pivot 66 on another link 68 and it causes the link 68 to pivot about another pivot 70 which connects the link 68 to the surface actuator 54. When the link 68 rotates about pivot 70, another pivot 72 intermediate between pivots 66 and 70 on the link 68 is displaced in proportion to the movement of the pivot 66. The pivot 72 connects the link 68 to the link 60 which in turn is connected by pivot 74 to link 62 at an intermediate position therealong. Displacement of the pivot 72 causes link 62 to rotate about pivot 64 which is fixed by the inactivated and centered servo actuator 46 as aforesaid. This causes a proportional displacement of the pivot 76 at the opposite end of the link 62 which pivot 76 connects the link 62 to the flow control valve 52. Therefore, a displacement of pivot 66 causes displacement of the flow control valve 52 which in turn supplies hydraulic fluid to the appropriate side of the surface actuator 54. The actuator 54 is driven thereby to a position which repositions pivot 70 and links 68, 60 and 62 to renull the flow control valve 52 to stop the movement of the surface actuator 54 and the connected control surface 24 at the position corresponding to the new position of the control column 16. The arrows and the + and − signs on FIG. 3 arbitrarily show the relative directions of motion of the various portions thereof.

When the system 10 is energized, it is conventionally required that the mechanical control system connected to pivot point 66 be driven to a position corresponding to the actual position of the control surface 24. Therefore, the lockout means 58 are engaged during AFCS operation thereby fixing the position of pivot 72. This fixes the center of the link 68 so that the position of the control column 16 normally corresponds to the position of the control surface 24. The engagement of lockout means 58 also fixes the pivot 74 on the link 62 so that the AFCS servo 12 can drive the flow control valve 52 through the link 62.

To get a better feeling of the operation of the surface actuation system shown in FIG. 3, assume a positive surface position command signal is supplied instantaneously to a summer 78 whose output is connected to the summer 50 previously mentioned. Initially the full command signal will be applied to the transfer valve 44 by the summer 50 thus producing hydraulic flow to the servo actuator 46. The servo actuator 46 moves until its position sensor 48 produces a feedback signal equal but opposite in polarity to the position command signal applied to the summer 50. At this time the input signal to the transfer valve 44 from the summer 50 becomes zero, closing the valve 44 to stop the hydraulic flow and therefore the servo actuator 46 stops moving. Since the servo actuator 46 is now displaced and since the pivot 74 on the link 62 is fixed by the lockout means 58, the link 62 is rotated about the pivot 74 and has displaced the flow control valve 52 which therefore is supplying hydraulic flow to the surface actuator 54 to drive the connected control surface 24 to some new position. As the surface actuator 54 moves to this new position, link 68 rotates about the pivot 72 which is also fixed by the lockout 58 to drive the mechanical control system connected at pivot point 66. At the same time the surface actuator position sensor 56 produces a feedback signal of proper polarity which is fed as another input to the summer 78. This feedback signal reduces the signal fed from the summer 78 to summer 50 to a value less than the feedback input signal fed thereto from the servo position sensor 48. The input signal from the summer 50 to the transfer valve 44 is therefore opposite in sense from the input signal from summer 78 to the summer 50 and thus the servo actuator 46, due to the action of the transfer valve 44, moves back toward its center position until the output signal of the position sensor 48 equals the output signal of the summer 78. This, of course, moves the flow control valve 52 toward its null position and reduces the actuation rate of the surface actuator 54. This action continues until the surface actuator 54 has reached a position where its position sensor 56 feeds back a signal equal to the command signal fed to summer 78. At this time the output of the summer 78 to the summer 50 is zero and the servo actuator 46 has returned to its center position to null the flow control valve 52.

Figure 4:
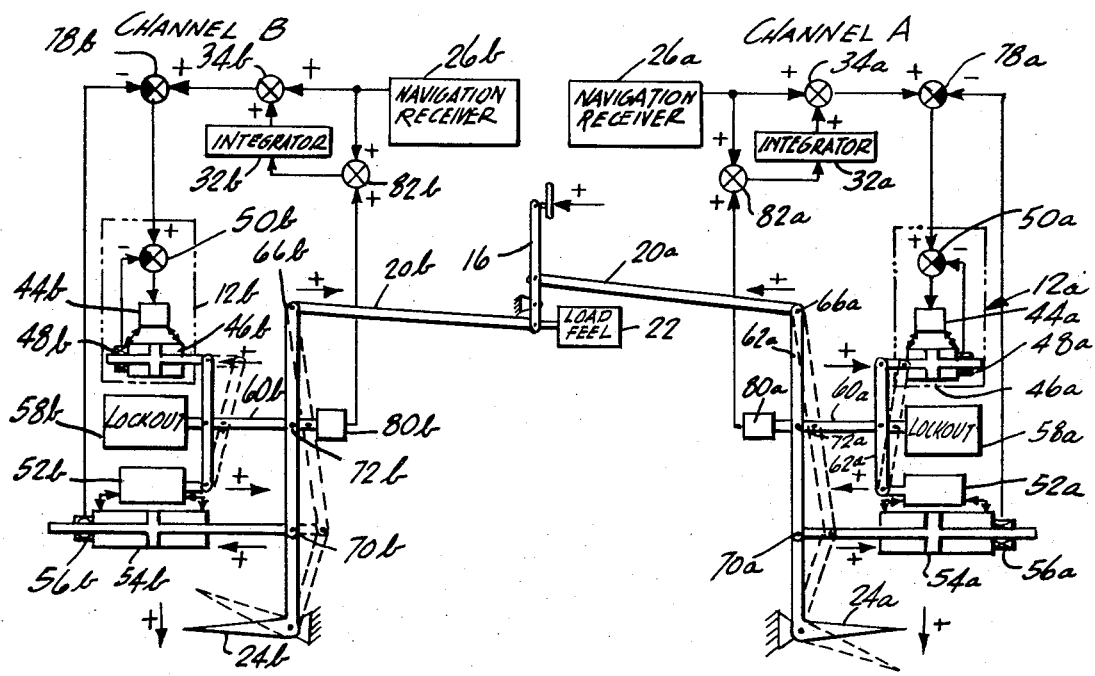
FIG. 4 is a schematic representation of a dual channel automatic flight control system with equalization.

FIG. 4 shows a dual channel AFCS including channel A and channel B which are each similar in construction and operation to the system shown in FIGS. 1 through 3. The components of channel A which are similar to those shown in FIGS. 1 through 3 have the same numbers with the postscript "a" while the similar components of channel B have the postscript "b".

If all the components of channels A and B were identical, the operation thereof when connected in parallel would be the same as the operation of one alone. Unfortunately, it is a practical impossibility to get two channels which have zero tolerances therebetween and therefore means must be provided to eliminate the effects of dissimilarities between the two channels.

The effect of system dissimilarities can be seen in the following example. For purposes of discussion it is assumed that the AFCS servos 12a and 12b will be driven hard over by input command signals corresponding to 5° of control surface motion. It is also assumed that if the pivot points 66a and 66b are restrained while the AFCS servos 12a and 12b are hard over, 5 degrees of control surface motion will mechanically return the flow control valves 52a and 52b to their null positions. This condition is shown in dotted outline. Assume further that the aircraft is in equilibrium on the desired flight path and that the tolerances in the navigation receivers 26a and 26b cause the path error signal from the receiver 26a to be slightly negative. This will cause the A channel integrator 32a to run in the positive direction and the B channel integrator 32b to run in the negative direction. This in turn causes the two control surfaces 24a and 24b to move about the same amount but in opposite directions. Since the control surfaces 24a and 24b move the same amount, the average aerodynamic surface position is unchanged so there is no aircraft response. Both integrators 32a and 32b will therefore continue to run until they saturate and control is lost. Since the force required to override each lockout means 58a and 58b is nominally the same, since the mechanical control system including the control column 16 is preloaded in neutral by the load feel means 22 and since the pivot points 66a and 66b for this example, are assumed to be rigidly connected to the control column 16 by the mechanism of the mechanical control systems 20a and 20b, pivot points 66a and 66b are effectively fixed and both lockout means 58a and 58b are overridden.

There are now three feedback paths in each channel to be considered. These feedback paths are the AFCS servo actuator electrical position feedback, the surface actuator electrical position feedback and (since the lockout means 58a and 58b are overridden and effectively out of the picture) the surface actuator mechanical feedback. From the assumptions made above, the integrators 32a and 32b are running to saturation and their output signals are very large and opposite in polarity. The AFCS servo actuators 46a and 46b will therefore be hardover in opposite directions and the feedback signals from their position sensors 48a and 48b to the summers 50a and 50b respectively, will correspond to 5° of surface command. The surface actuator 54a and 54b will mechanically null the flow control valves 52a and 52b and achieve equilibrium when they have moved 5°. At this time the feedback signal from the surface position sensors 56a and 56b will also correspond to 5° of surface command. The total electrical feedback therefore will correspond to 10° of surface command. Thus equilibrium of the surfaces 24a and 24b is initially achieved when the total surface command is +10° in the A channel and −10° in the B channel. Further increases in surface command as the integrators 32a and 32b run to saturation will have no effect on the surface actuation systems since they have already saturated because of the hardover AFCS servos 12a and 12b. Changes in the path error signals in either channel will thereafter no longer exert any control unless their magnitude is sufficient to reduce the absolute value of the surface commands to less than 10° or until they reverse polarity at the integrator inputs and sufficient time elapses to run the integrators 32a and 32b back down from saturation. Thus AFCS control is effectively lost.

In the actual case, there is, of course, some transient aircraft response due to differences in integrator rates, surface effectivities and the like but the end result will be the same; that is, split control surfaces and the loss of control with the aircraft most probably diverging from the desired flight path. The difference between navigation receivers which was the primary trouble in the above example, is only one possible cause of this problem. Differences in the characteristics of any of the components in the system will have a similar effect.

In the present invention the above discussed problem is solved by providing equalization means to prevent the integrators 32a and 32b from running while small differences between the path error signals exist. These equalization means can include lockout override sensors 80a and 80b connected respectively to the lockout means 58a and 58b such as by means of link 60a and 60b. The lockout override sensors 80a and 80b can be comprised of various devices which generate signals which are proportional to the amount that the respective lockout means 58a and 58b are overridden. An example of such a device is a linear variable differential transformer. Such transformers vary their output signals in proportion to the linear displacement of a portion thereof, which portions in the present invention are connected to links 60a and 60b.

The output signals from the lockout override sensors 80a and 80b are fed respectively to summers 82a and 82b. The summers 82a and 82b combine the output signals from the lockout override sensors 80a and 80b with the output signals from the navigation receivers 26a and 26b and feed the respective outputs therefrom as the input signals to the integrators 32a and 32b. The output signals from the lockout override sensors 80a and 80b can also be used with appropriate means to monitor the operation of the control system.

If the aircraft with equalization means included in its AFCS is in equilibrium on the desired flight path with a slightly positive path error signal from the receiver 26a and a slightly negative path error signal from receiver 26b, the following will happen. Since the path error signals command different control surface positions, the control surfaces 24a and 24b are slightly split; that is, driven in the opposite directions. If the average control surface position is neutral, the load feel means 22 preload the mechanical control system to neutral. Since the lockout means 58a and 58b have about the same characteristics as shown in the force (F) vs. deflection ($\delta$) diagram of FIG. 3, both will be in an overridden condition. The lockout override sensors 80a and 80b will therefore produce equalization signals which are combined with the path error signals from the receivers 26a and 26b in the summers 82a and 82b and then are fed as the input signals to the integrators 32a and 32b respectively. As long as the magnitudes of the equalization signals are less than the residual path errors, the integrators 32a and 32b will run. The signals fed to the AFCS actuators 46a and 46b from the integrators 32a and 32b will therefore increase causing the control surfaces 24a and 24b to split further and thus increasing the amount of override of the lockout means 58a and 58b and the magnitude of the equalization signal from the lockout override sensors 80a and 80b. When the equalization signal and the residual path error signal are equal in either channel, the integrator in that channel will stop running. When both integrators 32a and 32b have stopped, the signals to the AFCS actuators 46a and 46b will be equal to the sum of the respective path errors and integrator outputs, with the AFCS actuators 46a and 46b displaced proportionately thereto. In equilibrium, the surface actuators 54a and 54b will override the lockout means 58a and 58b only the amount required to null the flow control valves 52a and 52b. The amount of surface split is therefore proportional to the gain in the equalization signal loop. It can be seen that under these circumstances neither path error signal is driven to zero. Therefore, the aircraft flies to some flight path between the flight paths commanded by each of the two AFCS channels. Since each channel must itself be capable of meeting the minimum performance requirements desired for proper control of the aircraft, it follows that any flight path between the two flight paths commanded must likewise meet or better these requirements.

If some average surface deflection is required on the other hand, the load feel means 22 will apply force resisting control system motion while the actuators 54a and 54b drive the system away from neutral. This will cause the surface actuator which is farthest displaced from neutral to be overridden since its associated lockout cannot supply sufficient force to oppose both the lockout force generated in the other channel and the force generated by load feel means 22. The surface actuator nearer neutral will be aided by the load feel means 22 and thus the force it must supply is less than its capacity and it will not be overridden. Since no equalization signal can exist for the channel nearer neutral because it is not overridden, the path error signal therein will be driven to zero by the associated integrator. In this manner the AFCS channel whose surface position command is nearest neutral is the controlling channel.

As can be seen, the end result of the use of the sensors 80a and 80b is to produce a signal representative of the difference existing in each channel between the position of the manual control column 16 and the control surface 24a or 24b and its respective actuator 54a or 54b. If it is desired to compensate for the well known resiliency of mechanical control systems especially in large aircraft, the same signal as generated by the sensors 80a or 80b for transmission to the summers 82a or 82b can be generated by combining the output of the position sensor 56a or 56b with a column position signal from a position sensor (not shown) similar to sensors 80a or 80b connected at the control column 16.

The above-described equalization means are also adaptable to three or more channel systems which operate and are schematically similar to the two channel AFCS discussed above with the exception that the actuators and control surfaces or control mixers for each additional channel are required to be connected to the same mechanical control system. Operation of these multiple channel systems is basically the same as in the two channel case. Without equalization the systems with more than two channels present the same possibility of split surfaces with, in the case of a four channel system, two surfaces going in each direction until mechanically overridden and stopped at which time control is lost. With equalization means included in the four channel system and with neutral average surface position commanded, the two channels having residual path errors above the neutral average and the two having the errors below the neutral average split and equalize to command the aircraft flight path to some point between the two path errors which are closest to the average. When some surface deflection is commanded, the two channels having the extreme path errors are overridden and equalized in opposite directions. That channel of the remaining two channels whose command is closer to the surface neutral position is not overridden and therefore that channel becomes the commanding channel while the other median value channel is overridden sufficiently to equalize its path error.

Thus, there has been shown and described equalization means for multichannel automatic flight control systems which fulfill all the objects and advantages sought therefore. Many changes, modifications, variations and other uses and applications for the subject equalization means will, however, become apparent to those skilled in the art after considering this disclosure and the accompanying drawings. All such changes, modifications, alterations and other uses and applications which do not depart from the spirit and scope of the invention are deemed to be covered by this invention which is limited only by the claims which follow.

What is claimed is:

1. An aircraft flight control system having at least two relatively independent channels including:

manual control signal input means, and in each channel:

navigation means capable of producing path error output signals representative of the aircraft position with respect to the desired flight path;

means for converting said path error output signals into path correction signals for returning the aircraft to the desired flight path;

control surface actuator means connected to move and position a control surface of the aircraft;

servo means for controlling said control surface actuator means in response to said path correction signals which are fed thereto;

linkage means predeterminately connecting said servo means to said control surface actuator means, said linkage means including a pivot point thereon;

lockout means connected to said linkage means to fix said pivot point until a predetermined overriding magnitude of force is applied thereto at which said pivot point is deflected in relation thereto;

lockout override sensor means connected to said lockout means capable of producing override output signals in correspondence to deflection of said pivot point; and means connecting said linkage means to said manual control signal input means so that all the channels are interconnected through said manual control signal input means, whereby said converting means combine the override output signals with the path error signals, integrate the combined signals, and combine the integrated combined signals with the path error signals to produce said path correction signals, said override output signals reducing any error in the system because of differences in each channel so that control of the aircraft can be maintained.

2. The system defined in claim 1 including:

means connected to bias said manual control signal input means to a neutral position, said bias means thereby biasing the channels to neutral so that if both channels are on the same side of the neutral only the one furthest from neutral is likely to have its lockout means in an overridden condition.

3. The system defined in claim 1 wherein said lockout override sensor means include a variable transformer which produces an electrical override output signal in response to deflection of said lockout means.

* * * * *